Feb. 17, 1970  J. D. MORGAN  3,495,916
LIGHT PULSE METER

Filed June 14, 1966  2 Sheets-Sheet 1

John D. Morgan
INVENTOR.

BY Carl B. Fox, Jr.
ATTORNEY

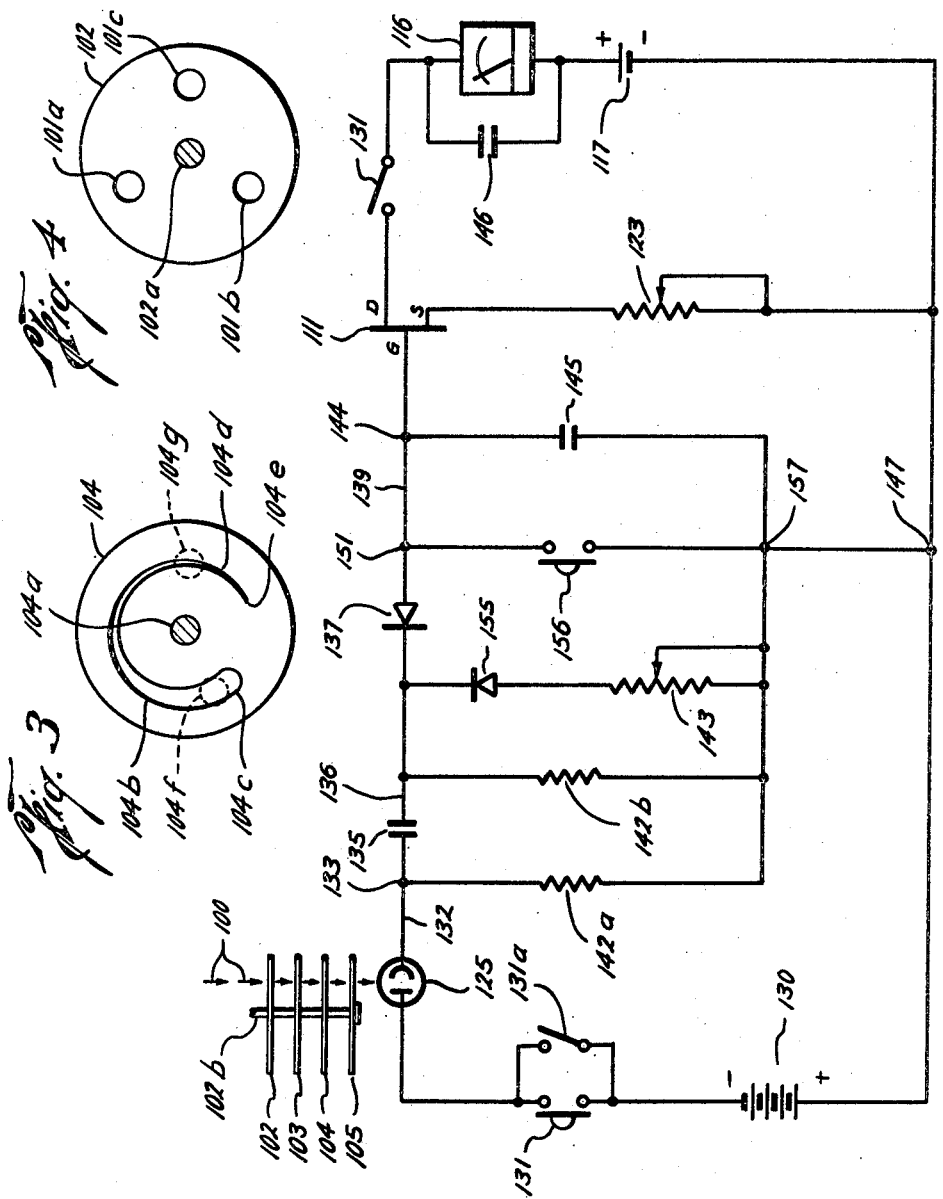

United States Patent Office

3,495,916
Patented Feb. 17, 1970

3,495,916
LIGHT PULSE METER
John D. Morgan, Pasadena, Tex., assignor to Mornick Instrument Company, Houston, Tex., a corporation of Texas
Continuation-in-part of application Ser. No. 362,136, Apr. 23, 1964. This application June 14, 1966, Ser. No. 562,059
Int. Cl. G01j *1/46, 1/44*
U.S. Cl. 356—215                                                      5 Claims

ABSTRACT OF THE DISCLOSURE

The disclosure is of light measurement apparatus particularly for measuring peak light intensities and cummulative light intensities. The measurements are made by energizing a grid or gate of a vacuum tube or transistor, respectively, in order to decrease the current passing through the tube or transistor. Charge retaining means is utilized for maintaining the grid or gate charge in response to impingement of light on a photosensitive device.

---

This application is a continuation-in-part of application Ser. No. 362,136, filed Apr. 23, 1964, entitled "Light Pulse Meter."

This invention pertains to apparatus for measuring the intensity of light, and more particularly to apparatus for measuring peak light intensity and cumulative light intensity.

It is a principal object of the invention to provide apparatus which accurately indicates peak light intensities.

A further object of the invention is to provide such apparatus which gives at least semi-permanent intensity indications, so that the indication is retained for a time after it is taken.

An additional object of the invention is to provide such apparatus which can be used to observe a series of exposures to light and give a cumulative indication of the sum of the light received from all of the exposures.

Another object of the invention is to provide such apparatus which is also adapted for use as an ordinary light meter, to indicate momentary incident light intensities.

Light meter apparatus for use in measurement of peak light intensities, which has heretofore been commercially available, has never been completely satisfactory. Since such apparatus must be designed to "hold" the peak light reading, it has been the practice in most cases to provide frictional means for holding the pointer or needle of a meter at its peak position. However, the friction also affects the sensitivity and accuracy of the apparatus since the pointer must overcome the frictional drag in moving to its peak position.

According to the present invention, a novel apparatus is provided wherein the meter pointer is held at its peak position by a retained electrical charge, so that there is no friction to resist pointer movement. Further, the instruments are easily reset for subsequent use by simply discharging the retained charge. Moreover, since the retained charge exists in the circuit following a reading, subsequent readings act to increase the charge so that a cumulative indication is achieved. Also, by elimination of charge retention, the meter performs as an ordinary light meter.

The meter can be made of very small size and weight, and can be coupled to the flash synchronization system of a camera so as to "see" the same light from a flash or strobe unit as will enter the camera during taking of a picture.

Two preferred embodiments of the invention are shown in the drawings and described. The first embodiment employs a vacuum tube as a control element, while in the second embodiment a field-effect transistor is employed as the control element.

Other objects of the invention will appear from the following description of the preferred embodiments thereof, reference being made to the accompany drawings showing in schematic representation the electrical circuits and other elements of the apparatus, including:

FIG. 2 is a schematic representation of the electrical circuit of the second preferred embodiment of the invention;

FIG. 3 is a plan view of a variable aperture element employed in connection with the invention; and, FIG. 4 is a plan view of a lens element employed in connection with the invention.

Figure 1:
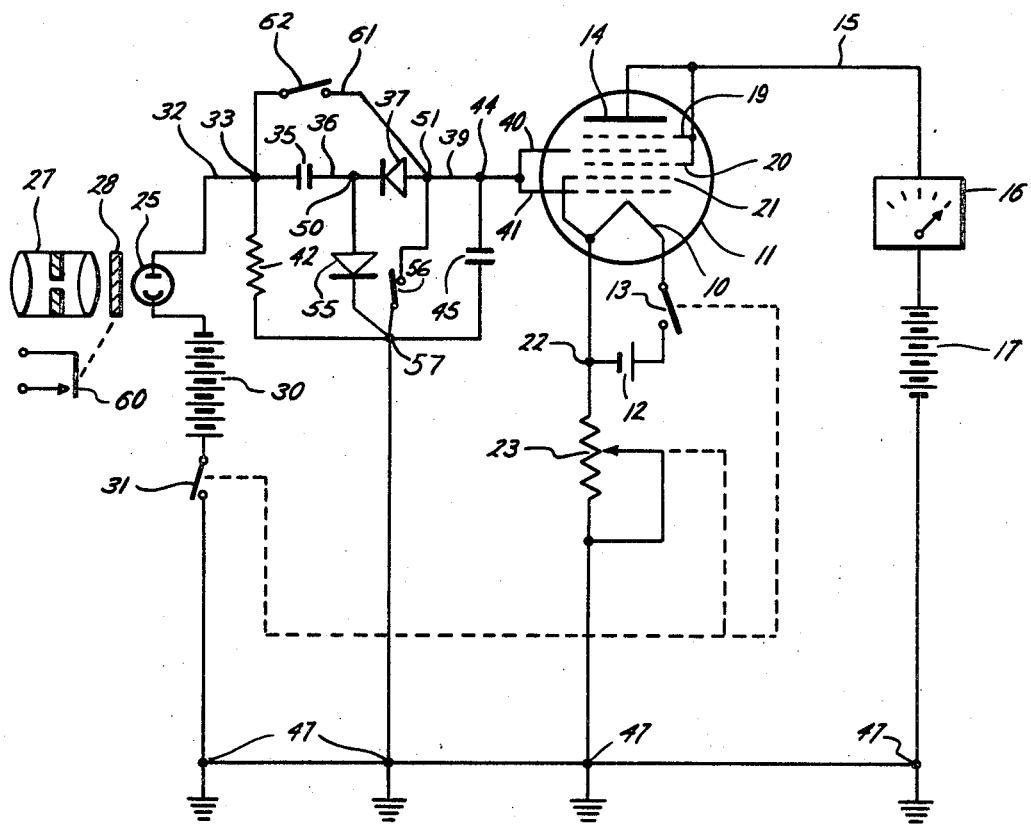
FIG. 1 is a schematic representation of the electric circuit of the first preferred embodiment of the invention.

Referring now to the drawings in detail, and first to FIG. 1 showing the first embodiment, the filament 10 of tube 11 is heated by battery 12, switch 13 providing "on-off" control of this portion of the circuit.

Plate 14 of tube 11 is connected by conductor 15 to the negative side of a milliammeter 16, the positive side of which is connected to the positive terminal of battery 17. As shown, the opposite side, or negative, of battery 17 is connected to ground.

Grids 19, 20 of tube 11 are tied together and connected to conductor 15. This increases the filament-plate current, and reduces the voltage required of battery 17 for obtaining a suitably large reading at ammeter 16, and thereby enabling the size and weight of the apparatus to be made minimal. Grid 21 is connected to filament 10. Point 22 of the filament circuit is connected to ground through variable resistance 23.

Phototube 25, which receives light admitted through lens and aperture 27 and shutter 28, decreases in electrical resistance the greater the intensity of light admitted. One side of phototube 25 is connected to the negative terminal of battery 30, the other side of the battery being connected to ground through on-off switch 31. The other side of phototube 25 is connected through conductor 32 to point 33 at one side of capacitor 35. The other side of capacitor 35 is connected through conductor 36 to one side of diode rectifier 37, which permits electrical current flow only from left to right as shown in the drawing.

Conductor 39 connects the other side of diode rectifier 37 to parallel control grids 40, 41 of tube 11.

Point 33 of conductor 32 is connected through resistance 42 to ground. Point 44 of conductor 39 is connected across capacitor 45 to ground.

All of the grounds indicated in the drawing may, of course, be tied together as indicated to a common tie point 47.

Point 51, at one side of diode rectifier 37 is connected to one side of switch 56, the other side of which is connected to ground.

Points 50, 57 are connected by a conductor having diode rectifier 55 therein as shown in the drawing, which causes maintenance of the same potential at point 50 as is present at point 33, since diode rectifier 55 does not permit current to outflow to discharge the charge at righthand side of capacitor 35, and the same charge is held at the left-hand side of the capacitor. Capacitor 35 and diode 37 make up an isolation network which causes the potential across capacitor 45 to persist until switch 56 is closed (or until eventual internal leakage dissipates the potential).

Operation of shutter 28 may be controlled, as the shutter of a camera, by a shutter switch 60 synchronized for "X" or "SM" or other flash light system. Switch 60 may be the synchronized shutter switch of a camera, the meter provided by this invention being plugged into the sockets of the camera into which the flash unit is normally plugged for use.

In the first preferred embodiment of the invention herein described, tube 11 may be a "1U6" with the grids modified as shown in the drawing; meter 16 may have full scale deflection at 200 milliammeters current; batteries 17, 30 may be 30 volt batteries (Eveready No. 413); battery 12 may be a 1.4 volt battery ("C" cell); resistance 23 may have 0–50 kilohm capacity; capacitor 35 may be a 1 microfarad capacitor and capacitor 45 may be a 2 microfarad capacitor; resistance 42 may be a 220 kilohm resistance; rectifier 37 may be a "2N3193"; and phototube 25 may be a "7536" phototube.

Conductor 61 containing on-off switch 62 may be provided to by-pass capacitor 35 and diode 37, closing of switch 62 enabling the apparatus to be operated as an ordinary light meter.

To operate the meter as a flash intensity, or pulse, meter to determine peak light, switches 13, 31 are closed and switches 56, 62 are opened. Shutter 28 is operated, for example by shutter switch 60, to admit a flash of light to impinge on the cathode of phototube 25. Electrical current is caused to flow through conductor 32, the current and consequent charges on capacitors 35, 45 depending on the amount of light impinging on tube 25; the more the light, the greater the current and the charge placed on the capacitors. Since shutter 28 is synchronized to be open only to admit the peak light of the flash or strobe employed, the magnitudes of the capacitor charges varies as the light intensity.

The current flow from filament to plate of tube 11 decreases logarithmically as the charge on grids 40, 41 is increased. Therefore, the current is initially set, by adjustment of rheostat 23, to give a full scale reading on meter 16. Light impinging on tube 25 therefore reduces the reading on meter 16 by reducing the tube 11 current. The greater the light, the greater the reduction of tube 11 current and the greater the reduction of the reading on meter 16 below the initial full scale reading.

Cumulative light introduced by re-opening shutter 25 increases the charges on capacitors 35, 45 to further reduce the reading on meter 16.

To discharge capacitors 35, 45 preparatory to another use of the apparatus, switch 56 is closed and then re-opened after the meter 16 reading has returned to full scale.

After a light reading is obtained, the reading at meter 16 remains constant for repeated reference for a relatively long period of time, because of the charges retained by the capacitors.

With switch 62 closed, the capacitor charges are not retained, and, with shutter 28 fixed in open position, continuing incident light readings are obtained.

The apparatus may be used as a comparison instrument, with or without calibration. Light intensities measurable with the instrument may be adjusted from extremely low to extremely high by varying the size of aperture and the shutter speed to admit more or less light to the phototube.

Referring now to FIG. 2 showing the second preferred embodiment of the invention, the circuit shown is very similar to the circuit shown in FIG. 1 of the drawings. Elements which have the same description as corresponding elements of FIG. 1 are designated in FIG. 2 by the same reference numerals as are shown therefor in FIG. 1, plus 100. These elements are not redescribed in connection with FIG. 2. The sizes and/or capacities of certain of these elements may, however, be changed in the FIG. 2 embodiment.

Light enters the apparatus in the direction indicated by arrows 100. The light passes through one of the lenses 101a, 101b or 101c (see also FIG. 4) of disc or turret 102 which is mounted for rotation about its central opening 102a which is carried on a pin or shaft 102b. A diffusion element 103 is disposed in the light stream following the lens disc. A variable aperture element 104 is in the light stream following element 103, and a second diffusion element 105 follows element 104. Each of elements 103–105 is rotatively mounted on pin or shaft 102b, in the same manner as lens disc 102.

A shutter arrangement may be, and preferably is, provided in the light stream as in the FIG. 1 embodiment.

Variable aperture disc 104 is a flat disc having a central opening 104a through which is disposed the pin or shaft 102b, disc 104 being rotatable about its center. An arcuate slot 104b is formed through disc 104 circularly about the center of the disc and spaced inwardly of the circular edge of the disc. The longitudinal center line of slot 104b is equally spaced circularly around the center of the disc. At one end 104c, slot 104b is relatively wide, and the width decreases smoothly (and preferably linearly) to relatively narrow end 104d of the slot, where the width of the slot may, as shown, diminish to zero, as at 104e. In FIG. 3, dashed-line circle 104f, of the same size as each of the lenses 101a, 101b, 101c, is shown at end portion 104c of slot 104b, and dashed-line circle 104g at end portion 104d of slot 104b. With one of the lenses at the position of circle 104f, the slot would pass light over substantially the full area of the lens, while with one of the lenses at the position of circle 104g, the slot would pass only a narrow wedge of light representing only a small portion of the area of the lens. Thus, slot 104b serves as an infinitely variable aperture. At one end of slot 104b, full lens opening is provided, and as the slot is relatively moved over the lens to the narrow end of the slot, the lens opening is continuously (and preferably linearly) reduced to zero. The slot may be reduced non-linearly to provide logarithmic and other reductions of the lens opening.

Lens 101a may, for example, be a wide angle lens, lens 101b a 40° lens, and lens 101c a 5° lens. Any other combination of, and number of, lenses may be provided as desired.

Diffusion discs 103, 105 may be constructed of diffusion material over their total surfaces, or, and preferably, may have one or more rotative openings (of the same size as the lenses) each having a disc of diffusion material therein, of the same or different diffusion characteristics.

Discs 102–105 are each rotatable independently to move the desired disc elements into the path of the light stream.

Capacitor 135 and diodes 137, 155, perform as a capacitance reactance (or "RC") network, to retain or hold a charge proportional to the amount of light received by photocell 125, and thus provide a reading or measure of the light at meter 116, as in the FIG. 1 embodiment.

Transistor 111, which replaces tube 11 of the FIG. 1 embodiment, is a so-called "field effect" transistor, of the "N" type, and, for example, the transistor known as "C 6796 FET" may be employed.

With reference to FIG. 2 of the drawings, the equipment components may, for example, be as follows: photo cell 125 may be a "7536" phototube; capabitor 135 may be 0.25 microfarad; resistances 142a, 142b may be, respectively, 33K and 47K; capacitor 145 may be 1.04 mfd.; variable resistor 123 may be 0–10 kilohms; and battery 117 may be a 1½ volt battery, the other components consistent therewith. Also, transistor 111 may be an N type C 6796 FET, capacitor 145 may be a 1.0 mfd. capacitor, and variable resistor 143 will be of a resistance range suitable for suitable adjustment of the clamp-in position of the associated diode.

Variable resistor 143 is, as shown in the drawing, in series with diode 155.

An RF bypass, including capacitor 146, is in parallel with meter 116. Capacitor 146 may be of 0.001 mfd. capacity.

The operation of the FIG. 2 embodiment is the same as for the FIG. 1 embodiment.

It will be understood that the imput light system of the FIG. 1 embodiment may be employed in the FIG. 2 embodiment, and that the input light system of the FIG. 2 embodiment may be employed in the FIG. 1 embodiment.

In the FIG. 2 embodiment, the RC network is discharged by closing normally open reset switch 156. Pushbutton switch 131 (normally open) is closed when a reading is to be taken to determine the intensity of constant light. Switch 131a is an auto flash switch closed to determine the intensity of a flashlight, or the like.

I claim:
1. Light meter, comprising photoelectric means coupled with electrical current inducing means for providing a charging electrical current in response to light proportional to intensity of the light, first capacitor means charged by said charging current, second capacitor means connected through diode rectifier means to said first capacitor means whereby when said first capacitor means is charged by said charging current said second capacitor means is charged through said diode rectifier means, said diode rectifier means holding the charge on said second capacitor means when said first capacitor means is discharged, meter circuit means having control means for decreasing electrical current through said meter circuit means proportional to the charge on said second capacitor means, whereby the meter circuit current decreases proportional to the intensity of light striking said photoelectric means to give indication of the intensity of light, and whereby said decreased meter circuit current will remain to preserve said indication until said second capacitor means is discharged.

2. The combination of claim 1, including means for discharging said second capacitor means.

3. The combination of claim 2, including normally-open switch controlled by-pass means for introducing said charging current directly to said second capacitor means when the switch thereof is closed, whereby said second capacitor means does not retain charges placed thereon and performs as an ordinary instant-reading light meter.

4. The combination of claim 1, said control means being a control grid of a vacuum tube, said meter circuit means extending between the filament and plate of said vacuum tube.

5. The combination of claim 1, said control means being the gate of a field effect transistor, said meter circuit means extending between the source and drain of said transistor.

References Cited

UNITED STATES PATENTS

| | | |
|---|---|---|
| 2,410,550 | 11/1946 | Padva. |
| 2,588,368 | 3/1952 | Edgerton. |
| 3,062,092 | 11/1962 | Schmidt. |
| 3,057,254 | 10/1962 | Drury. |
| 3,106,141 | 10/1963 | Estes. |
| 3,157,789 | 11/1964 | Thomas. |
| 3,344,703 | 10/1967 | Milton. |
| 3,348,054 | 10/1967 | Stimson et al. |

FOREIGN PATENTS 1,143,904  10/1957  France.

JEWELL H. PEDERSEN, Primary Examiner

W. A. SKLAR, Assistant Examiner

U.S. Cl. X.R.

356—226